Patented May 11, 1937

2,080,132

UNITED STATES PATENT OFFICE 2,080,132

PREPARATION OF THE THYROID GLAND

Horace A. Holaday, Highland Park, and Edward D. Perry, New Brunswick, N. J., assignors to E. R. Squibb & Sons, New York, N. Y., a corporation of New York No Drawing. Application August 22, 1934, Serial No. 740,890

9 Claims. (Cl. 167—76)

This invention relates to preparations of the active principles of the thyroid gland.

That the thyroid gland possesses great medicinal value is common knowledge. Preparations thereof hitherto available, however, have been characterized by difficulties of manufacture and/or impurities, militating against the economy, safety, and efficiency with which this potent factor may be utilized. Thus, desiccated thyroid, on the one hand, suffers from the serious disadvantage that it exhibits troublesome variability with respect to both iodine content and to the relation between physiological activity and iodine content, whereas proper treatment requires that the exact dosage be specifically determined and maintained for each patient; and thyroxin, on the other hand, though clinically superior because its physiological activity is accurately known, is unduly expensive for the reason that its manufacture entails the loss of more than eighty-five percent of the physiological activity of the gland.

It is an object of this invention to provide a therapeutic agent comprising a physiologically standardizable preparation of the thyroid gland, free from variability in activity and comparatively inexpensive to manufacture. It is a further object of this invention to provide a method whereby physiologically inactive iodine compounds may be removed from the thyroid gland and substantially the entire physiological activity of the gland may be retained. It is a still further object of this invention to provide a concentrate—having substantially the entire physiological activity of the thyroid gland—suitable for use in making small tablets that can be adjusted to a predetermined degree of physiological activity.

In the practice of this invention, the thyroid gland is subjected to partial autolysis, and the dissolved portion of the autolysate is preferably removed. The undissolved residue so obtained has, in standardizable form and with little inert matter, substantially the entire physiological activity of the gland. Preferably: the autolysis is effected in an acidic (say, pH 4.0 to 4.5) and antiseptic medium and at about normal body temperature; and is discontinued when—as determined by sampling the digestion mixture at intervals—the filtrate contains between fifteen percent and twenty-five percent, optimally about twenty percent, of the total iodine (discontinuance at a much earlier stage would leave too much inert matter in the residue, and discontinuance at a much later stage would involve destruction of a considerable proportion of the active principles).

As a specific example, 3.38 kg. minced pork thyroid gland was thoroughly mixed with 16.9 l. N/50 hydrochloric acid. The pH of the mixture, 4.6, was adjusted to 4.2 by adding 50 cc. N hydrochloric acid. 240 cc. chloroform was added, and surface contamination was prevented by means of a layer of liquid petrolatum containing 0.3% beta naphthol. The mixture was incubated at 37° C., and autolysis was allowed to proceed for seven days, meanwhile the mixture being stirred three or four times daily and chloroform being added from time to time as required to maintain saturation. On the seventh day, the percentage of the original total iodine then present in the filtrate being 19.6, the mass was filtered through hard filter paper. The residue was pressed on hard paper in a hydraulic press, scraped from the paper, air-dried at about 40° C., defatted with benzene, ground, and sieved to remove threads of connective tissue. There remained the desired product, which had the unaltered activity of the gland in concentrated form, 304 g. of a fine, light-gray powder, having the chemical characteristics of a partially hydrolyzed and slightly denatured acid metaprotein of thyroglobulin, having little or no taste or odor, containing approximately 0.15% of water-soluble uncombined amino nitrogen as determined by formaldehyde titration, containing fibers of connective tissue as revealed by microscopic examination, insoluble in water, dissolving more rapidly in acid pepsin than does coagulated egg white, dissolving slowly in 0.2 percent sodium hydroxide to give a rather viscous solution that (a) does not coagulate on heating to 100° C. at pH 6.35 or 6.88 and (b) yields, upon addition of dilute lead acetate solution, a precipitate that redissolves upon addition of an excess of dilute lead acetate solution. This powder may be assayed and tableted in the conventional manner.

It is to be understood that the foregoing example is merely illustrative and by no means limitative of the invention, which may be variously otherwise embodied within the scope of the appended claims.

We claim:

1. In the preparation of a therapeutic agent, the steps of subjecting the thyroid gland to autolysis and discontinuing the autolysis when the filtrable portion of the autolysate contains between 15% and 25% of the total iodine.

2. In the preparation of a therapeutic agent, the steps of subjecting the thyroid gland to autolysis and discontinuing the autolysis when the filtrable portion of the autolysate contains between 15% and 25% of the total iodine and removing the filtrable portion.

3. In the preparation of a therapeutic agent, the steps of subjecting the thyroid gland to autolysis in an acidic medium and discontinuing the autolysis when the filtrable portion of the autolysate contains between 15% and 25% of the total iodine.

4. In the preparation of a therapeutic agent, the steps of subjecting the thyroid gland to autolysis in an acidic medium at about normal body temperature and discontinuing the autolysis when the filtrable portion of the autolysate contains between 15% and 25% of the total iodine.

5. In the preparation of a therapeutic agent, the steps of subjecting the thyroid gland to autolysis and discontinuing the autolysis when the filtrable portion of the autolysate contains about 20% of the total iodine.

6. In the preparation of a therapeutic agent, the steps of subjecting the thyroid gland to autolysis in a medium having a pH of about 4.2 and at a temperature of about 37° C. and discontinuing the autolysis after about 7 days.

7. In a therapeutic agent, a material obtained from the thyroid gland and having the chemical characteristics of a partially autolyzed and slightly denatured acid metaprotein of thyroglobulin.

8. In a therapeutic agent, a material obtained from the thyroid gland and having the chemical characteristics of a partially autolyzed and slightly denatured acid metaprotein of thyroglobulin, dissolving slowly in 0.2% sodium hydroxide.

9. In a therapeutic agent, a material obtained from the thyroid gland and having the chemical characteristics of a partially autolyzed and slightly denatured acid metaprotein of thyroglobulin, dissolving slowly in 0.2% sodium hydroxide to give a solution that does not coagulate on heating to 100° C. at pH 6.35.

HORACE A. HOLADAY.
EDWARD D. PERRY.